United States Patent
Kurth et al.

(10) Patent No.: US 12,168,670 B2
(45) Date of Patent: Dec. 17, 2024

(54) MODIFIED LECITHIN FOR ASPHALT APPLICATIONS

(71) Applicant: CARGILL, INCORPORATED, Wayzata, MN (US)

(72) Inventors: Todd L. Kurth, Maple Grove, MN (US); Suzanne Stauduhar, Robbinsdale, MN (US); Hassan Ali Tabatabaee, Plymouth, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 18/490,517

(22) Filed: Oct. 19, 2023

(65) Prior Publication Data

US 2024/0043454 A1    Feb. 8, 2024

Related U.S. Application Data

(60) Division of application No. 17/664,980, filed on May 25, 2022, now Pat. No. 11,820,786, which is a continuation of application No. 16/908,298, filed on Jun. 22, 2020, now Pat. No. 11,345,718, which is a continuation of application No. 15/574,760, filed as application No. PCT/US2016/033250 on May 19, 2016, now Pat. No. 10,689,406.

(60) Provisional application No. 62/164,123, filed on May 20, 2015.

(51) Int. Cl.
| | |
|---|---|
| C07F 9/10 | (2006.01) |
| C08L 85/02 | (2006.01) |
| C08L 91/00 | (2006.01) |
| C09K 8/60 | (2006.01) |
| C11B 13/02 | (2006.01) |
| C08L 95/00 | (2006.01) |

(52) U.S. Cl.
CPC ............ C07F 9/103 (2013.01); C08L 85/02 (2013.01); C08L 91/00 (2013.01); C09K 8/602 (2013.01); C11B 13/02 (2013.01); *C08L 95/00* (2013.01); *C08L 2555/22* (2013.01); *C08L 2555/50* (2013.01); *C08L 2555/64* (2013.01); *Y02A 30/30* (2018.01)

(58) Field of Classification Search
CPC . C07F 9/10; C08L 91/00; C08L 85/02; C09K 8/60; C11B 13/02
USPC ........................................................ 524/145
See application file for complete search history.

(56) References Cited

U.S. PATENT DOCUMENTS

| | | | |
|---|---|---|---|
| 2,020,662 A | 11/1935 | Schwieger | |
| 2,150,732 A | 3/1939 | Thurman | |
| 2,383,097 A | 8/1945 | Bruce | |
| 2,508,431 A | 5/1950 | Smith | |
| 2,574,930 A | 11/1951 | Reginald | |
| 2,592,564 A | 4/1952 | Hardman | |
| 2,673,813 A | 3/1954 | Feller | |
| 2,793,996 A | 5/1957 | Lummus | |
| 2,901,369 A | 8/1959 | Pordes | |
| 3,340,203 A | 9/1967 | Ferm | |
| 3,357,918 A | 12/1967 | Davis | |
| 4,200,551 A | 4/1980 | Orthoefer | |
| 5,120,357 A | 6/1992 | Eichberg | |
| 5,131,225 A | 7/1992 | Roettger | |
| 5,164,002 A | 11/1992 | Ballenger, Jr. | |
| 5,744,524 A | 4/1998 | Manandhar | |
| 5,820,663 A | 10/1998 | Miller | |
| 5,928,418 A | 7/1999 | Tamaki | |
| 6,440,478 B1 | 8/2002 | Benton | |
| 6,713,522 B2 | 3/2004 | Zhang | |
| 6,822,012 B1 | 11/2004 | Baumgart | |
| 7,951,862 B2 | 5/2011 | Bloom | |
| 8,232,418 B1 | 7/2012 | Bilbie | |
| 9,644,173 B2 | 5/2017 | Reinke | |
| 2002/0077377 A1 | 6/2002 | Zhang | |
| 2004/0111955 A1 | 6/2004 | Mullay | |
| 2004/0161520 A1 | 8/2004 | Maynes | |
| 2005/0027024 A1 | 2/2005 | Zhang | |
| 2007/0161812 A1 | 7/2007 | Lemonds | |
| 2008/0314294 A1 | 12/2008 | White | |
| 2010/0261805 A1 | 10/2010 | Abraham | |
| 2013/0102694 A1 | 4/2013 | Keaton | |
| 2014/0066347 A1 | 3/2014 | Baseeth | |
| 2014/0275593 A1 | 9/2014 | Hora | |
| 2014/0338565 A1 | 11/2014 | Severance | |

FOREIGN PATENT DOCUMENTS

| | | |
|---|---|---|
| CA | 2163815 A1 | 5/1996 |
| CA | 2315955 A1 | 2/2002 |
| CN | 102532925 A | 7/2012 |
| GB | 382432 A | 10/1932 |

(Continued)

OTHER PUBLICATIONS

"Lecithin", Internet Citation, Jan. 1, 2014 (Jan. 1, 2014), pp. I-1, XP003035477, URL:http://en.wikipedia.org/wiki/Lecithin.
Adhikari S et al: "Indian Ricebran Lecithin", Journal of the American Oil Chemists Society, vol. 63, No. 10, Oct. 1, 1986 (Oct. 1, 1986), pp. 1367-1367, XP055847183, DE, ISSN: 0003-021 X, DOI: 10.1007/BF02679604.
Alemdar, "Production of oil-based binder by RAFT polymerization technique", Progress in Organic Coatings, Dec. 2010, 522-526.
Anonymous, "Polyphosphoric Acid Modification of Asphalt Binders, E-C160", Transportation Research Circular Jan. 2012, Apr. 8, 2009 (Apr. 8, 2009), pp. 1-172, XP055066169, Retrieved from the Internet: URL: www.tbr.org.
Anonymous: "Soybean oil—Wikipedia", Nov. 13, 2018 (Nov. 13, 2018), pp. 1-4, XP055523288, Retrieved from the Internet: URL:https://en.wikipedia.org/wiki/Soybean_oil.

(Continued)

*Primary Examiner* — Deve V Hall

(57) ABSTRACT

Embodiments of the present invention provide a method, comprising obtaining a lecithin-containing material, in some aspects derived from a crude refining stream, comprising 20-80 wt % acetone insoluble matter, 1-30 wt % free fatty acid, and less than 10 wt % water, adding a fatty acid or carboxylic source to the lecithin-containing material to obtain a lecithin fatty acid blend or lecithin carboxylic acid blend and incorporating the blend into asphalt or oil field applications.

5 Claims, 2 Drawing Sheets

(56) References Cited

FOREIGN PATENT DOCUMENTS

Figure 1:
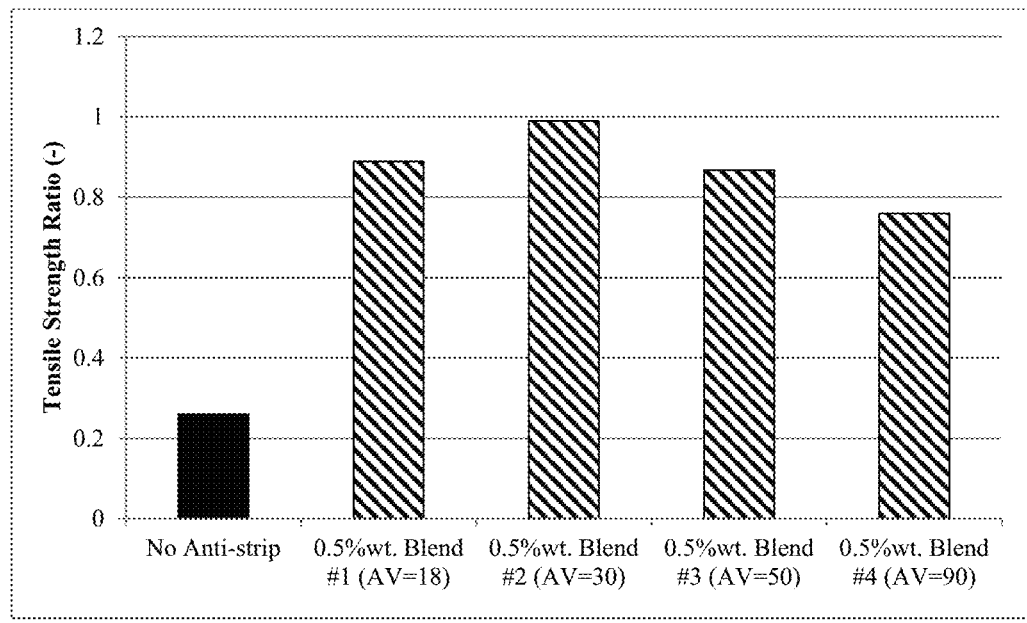

| GB | 2462371 A | 2/2010 | | |
|---|---|---|---|---|
| JP | S4939612 A | 4/1974 | | |
| WO | 2014129758 A1 | 8/2014 | | |
| WO | 2016054035 | 4/2016 | | |
| WO | WO-2016054035 A1 * | 4/2016 | ............ | A23D 9/013 |

OTHER PUBLICATIONS

Aquilina Gabriele et al: "Safety and efficacy of lecithins for all animal species", The EFSA Journal, vol. 14, No. 8, Aug. 1, 2016 (Aug. 1, 2016), p. 4561, XP055846897, Parma, IT, ISSN: 1831-4732, DOI: 10.2903/j.efsa.2016.4561, Retrieved from the Internet: URL:https://efsa.onlinelibrary.wiley.com/doi/pdfdirect/10.2903/j.efsa.2016.4561.

C. R. Scholfield: "Composition of soybean lecithin", Journal of the American Oil Chemists' Society (JAOCS), vol. 58, No. 10, Oct. 1, 1981 (Oct. 1, 1981), pp. 889-892, XP055463512, DE, ISSN: 0003-021X, DOI:10.1007/BF02659652.

Daicheng Liu et al: "22 Soybean Phospholipids", Oct. 28, 2011 (Oct. 28, 2011), pp. 483-501, XP055208001, Retrieved from the Internet: URL:http://cdn.intechopen.com/pdfs-wm/22616.pdf.

Emmanuel Nyankson et al: "Soybean Lecithin as a Dispersant for Crude Oil Spills", ACS Sustainable Chemistry & Engineering, vol. 3, No. 5, Apr. 7, 2015 (Apr. 7, 2015), pp. 920-931, XP055493682, US ISSN: 2168-0485, DOI: 10.1021/acssuschemeng.5b00027.

Erickson "Degumming and Lecithin Processing and Utilization", Practical Handbook of Soybean Processing and Utilization. pp. 174-183. https://doi.org/10.1016/B978-0-935315-63-9.50014-0 (Year: 1995).

Fiume Z: "Final report on the safety assessment of Lecithin and Hydrogenated Lecithin", International Journal of Toxicology, Sage Publications, Inc, US, vol. 20, No. Su Ppl 1, Jan. 1, 2001 (Jan. 1, 2001), pp. 21-45, XP0081 02244, ISSN: 1091-5818, DOI: 10.1080/109158101750300937.

Godoy C A et al: "Effect of fatty acids on self-assembly of soybean lecithin systems", Colloids and Surfaces B: Biointerfaces, Elsevier Amsterdam, NL, vol. 131, Apr. 21, 2015 (Apr. 21, 2015), pp. 21-28, XP029179055, ISSN: 0927-7765, DOI: 10.1016/J.COLSURFB.2015.03.065.

Gunawan Setiyo et al: "Vegetable Oil Deodorizer Distillate: Characterization, Utilization and Analysis", Separation and Purification Reviews, vol. 38, No. 3, Jul. 1, 2009 (Jul. 1, 2009), pp. 207-241, XP055775963, US, ISSN: 1542-2119, DOI: 10.1080/15422110903095151.

Hutt, Weatherall, and Culshaw "The Determination of Total Phosphatide in Commercial Lecithin". Analyst, 1953, 78, 712-716. https://doi.org/10.1039/AN9537800712 (Year: 1953).

Lemuel M. Diamante et al: "Absolute Viscosities of Vegetable Oils at Different Temperatures and Shear Rate Range of 64.5 to 4835s-1", Journal of Food Processing, vol. 2014, Jan. 1, 2014 (Jan. 1, 2014), pp. 1-6, XP055364893, ISSN: 2356-7384, DOI: 10.1155/2014/234583.

M. Chappat: "Some applications of emulsions", Colloids and Surfaces A: Physiochemical and Engineering Aspects, vol. 91, Nov. 1, 1994 (Nov. 1, 1994), pp. 57-77, XP055526104, Amsterdam, NL, ISSN: 0927-7757, DOI: 10.1016/0927-7757(94)02976-8.

Nichireki Chem Ind Co Ltd, "English Abstract of JP49039612A", Apr. 13, 1974, 1 page.

Noureddini Hossein et al: "Viscosities of vegetable oils and fatty acids Viscosities of Vegetable Oils and Fatty Acids", Papers in Biomaterials 10, Dec. 1, 1992 (Dec. 1, 1992), XP055776000, Retrieved from the Internet: URL:https://digitalcommons.unl.edu/cgi/viewcontent.cgi?article=1012&context=chemeng_biomaterials.

Peter Van Hoogevest et al: "The use of natural and synthetic phospholipids as pharmaceutical excipients : The use of natural and synthetic phospholipids", European Journal of Lipid Science Technology, vol. 116, No. 9, Aug. 25, 2014 (Aug. 25, 2014), pp. 1088-1107, XP0553714 77, DE, ISSN: 1438-7697, DOI: 10.1002/ejlt.201400219.

Szuhaj, B. F., "Lecithin Production and Utilization", JAOCS vol. 60, No. 2 (Feb. 1983), https://link.springer.com/content/pdf/10.1007%2FBF02543508.pdf (Year: 1983).

Verleyen T et al: "Gas chromatographic characterization of begetable oil deodorization distillate", Journal of Chromatography A, Elsevier, Amsterdam, NL, vol. 921, No. 2, Jul. 6, 2001 (Jul. 6, 2001), pp. 277-285, NP004246405, ISSN: 0021-9673, DOI: 10.1016/S0021-9673(01)00881-0.

W Y: "Fractionation of crude soybean lecithin with aqueous ethanol", Journal of the American Oil Chemists' Society, vol. 81, No. 7, Jan. 1, 2004 ((Jan. 1, 2004), pp. 697-704, XP055044623.

Y. El-Shattory et al: "Soybean lecithin: acetone insoluble residue fractionation and their volatile components", Grasas Y Aceites, vol. 53, No. 3, Sep. 30, 2002 (Sep. 30, 2002), pp. 319-323, XP055525721, Spain, ISSN: 0017-3495.

Yan S et al: "Oil transesterification over calcium oxides modified with lanthanum", Applied Catalysis A: General, Elsevier, Amsterdam, NL, vol. 360, No. 2, Jun. 1, 2009 (Jun. 1, 2009), pp. 163-170, XP026089927, ISSN: 0926-860X, DOI:10.1016/J.APCATA.2009.03.015.

\* cited by examiner

MODIFIED LECITHIN FOR ASPHALT APPLICATIONS

CROSS-REFERENCE TO RELATED APPLICATIONS

This application is a Divisional of U.S. application Ser. No. 17/664,980, filed May 25, 2022, which is a Continuation of U.S. Pat. No. 11,345,718, issued May 31, 2022, which is a Continuation of U.S. Pat. No. 10,689,406, issued Jun. 23, 2020, which is a national phase of PCT Application No. PCT/US2016/033250, filed May 19, 2016, which claims the benefit of U.S. Provisional Patent Application No. 62/164,123, filed May 20, 2015, each of which are hereby incorporated by reference in their entirety.

TECHNICAL FIELD

This disclosure relates to the modification of lecithin using fatty acids or carboxylic acids for use in asphalt applications.

BACKGROUND

Recent technical challenges facing the asphalt industry have created opportunities for the introduction of agriculture-based products for the overall performance enhancement of asphalt. Such performance enhancements may include, for example but aren't limited to, anti-strip, organophilization, oil field, and compaction aid applications.

BRIEF SUMMARY

Embodiments of the present invention provide a method, comprising obtaining a lecithin-containing material, in some aspects derived from a crude refining stream, comprising 20-80 wt % acetone insoluble matter, 1-30 wt % free fatty acid, and less than 10 wt % water; adding a fatty acid source to the lecithin-containing material to obtain a lecithin fatty acid blend; and incorporating the lecithin fatty acid blend into asphalt or oil field applications.

Other embodiments of the present invention provide a method, comprising obtaining a lecithin-containing material, in some aspects derived from a crude refining stream, comprising 20-80 wt % acetone insoluble matter, 1-30 wt % free fatty acid, and less than 10 wt % water; adding a carboxylic acid source to the lecithin-containing material to obtain a lecithin carboxylic acid blend; and incorporating the lecithin carboxylic acid blend into asphalt or oil field applications.

FIGURES

FIG. 1 illustrates the effect varying fatty acid values of the blend have on the tensile strength ratio of an asphalt composition.

Figure 2:
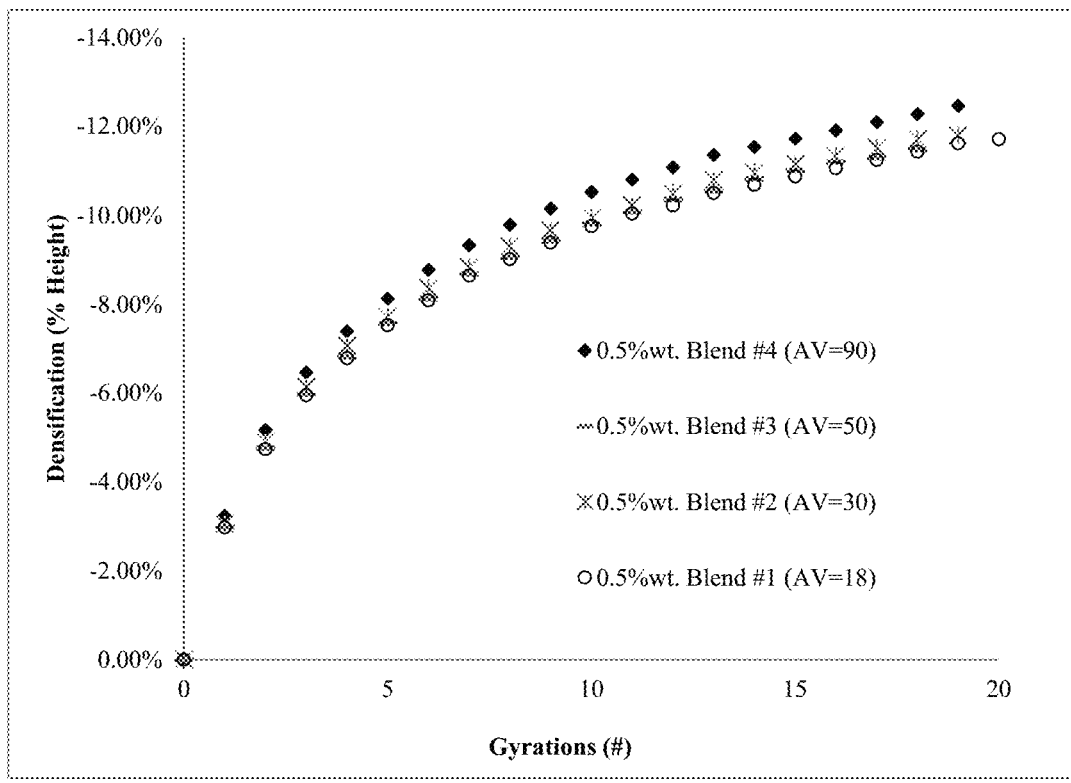
Figure 3:
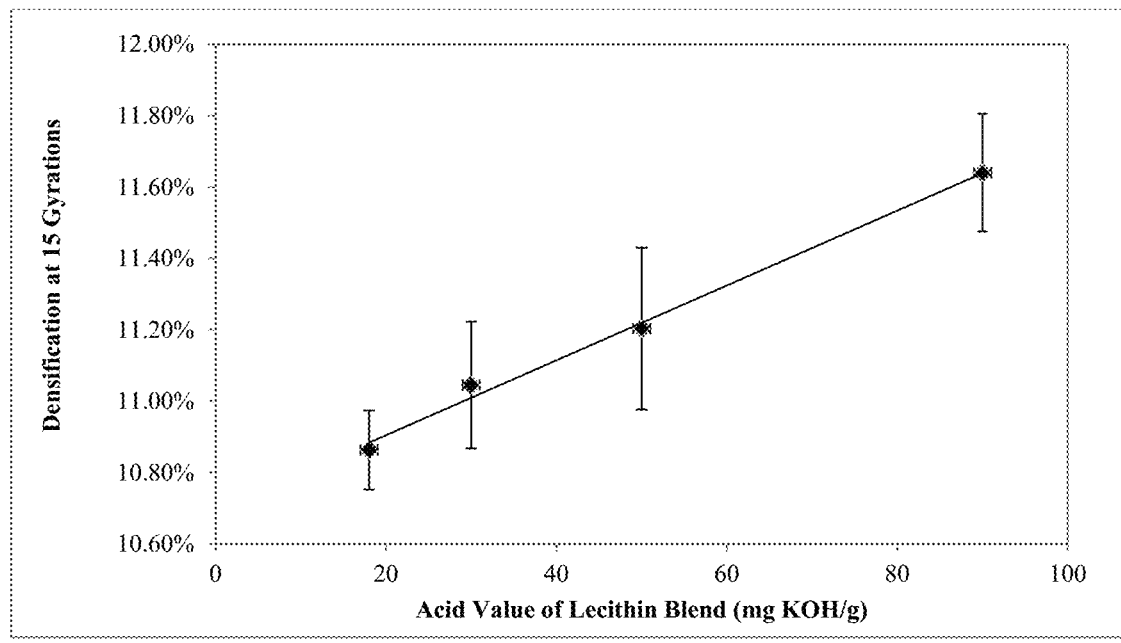

FIGS. 2 and 3 demonstrate the effect of the lecithin blend on the densification of asphalt mixture as function of compaction effort (number of gyrations).

Figure 4:
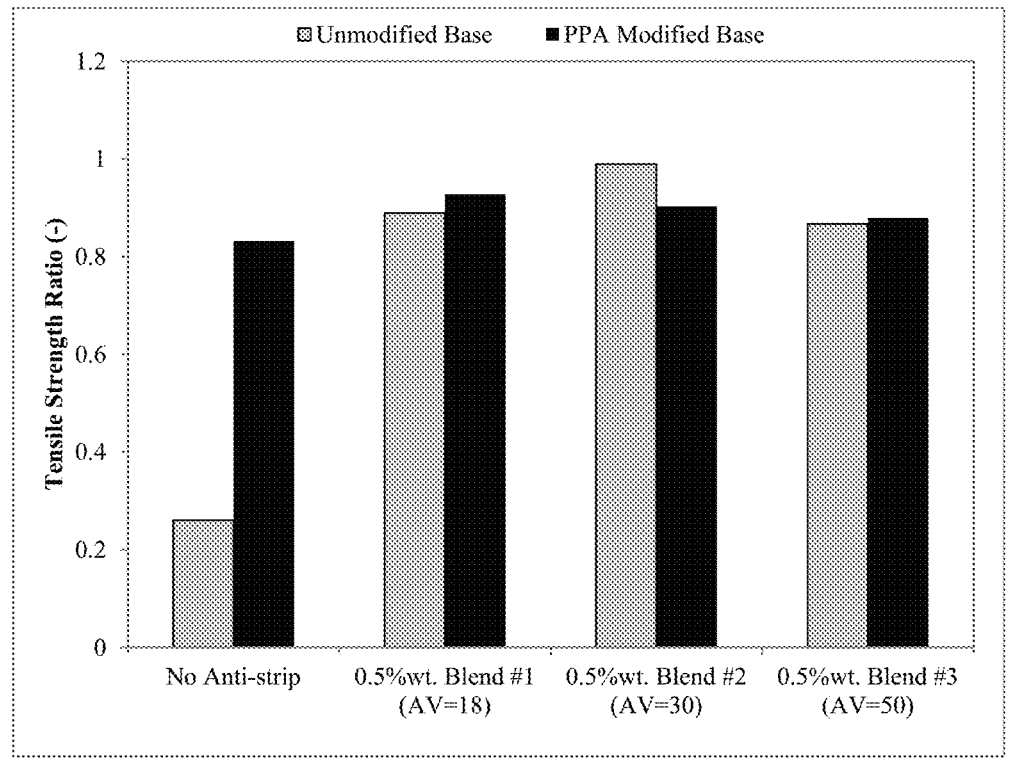

FIG. 4 demonstrates the presence of polyphosphoric acid does not lead to adverse effects on the ability of the lecithin blend to improve the moisture damage resistance of the asphalt mixture.

DETAILED DESCRIPTION

"Acid Value" (AV) is a measure of the residual hydronium groups present in a compound and is reported in units of mg KOH/gram material. The acid number is measured according to the method of AOCS Cd 3d-63.

"Acetone Insoluble Matter" (AI) determines the acetone insoluble matter in a sample and is reported as % per AOCS method Ja 4-46. The phosphatides are included in the acetone-insoluble fraction.

"Fatty Acid" is defined as a carboxylic acid having a chain of at least six carbon atoms.

"Gums" utilized herein are derived from plant-based materials, preferably corn, soy, canola (rapeseed), and cottonseed and are comprised of water, acetone insoluble matter (mostly phosphatides), free fatty acids, and oil.

"Lecithin" is a complex mixture of acetone-insoluble phosphatides combined with various amounts of other substances, such as triglycerides, fatty acids, and carbohydrates. Lecithin contains at least 50% of acetone insoluble matter.

"Phosphatides" include phosphatidic acid, phosphatidylinositol, phosphatidylethanolamine, phosphatidylcholine, and other phospholipids.

"Reaction" utilized herein primarily refers to the process of blending a lecithin-containing material and a fatty acid or carboxylic acid source, optionally with additional heat.

Lecithin-Containing Material

The lecithin-containing material utilized herein is preferably derived from crude refining streams containing fatty acids and phosphatidyl material. In some aspects, the lecithin-containing material may be gums resulting from a degumming processes, for example, but not limited to, water degumming, caustic and acidic degumming, phospholipase A and phospholipase C degumming, or other enzymatically produced gums (one skilled in the art would know that phospholipase A would produce lyso lecithin). In other aspects, the lecithin-containing material may come from other oils or crude refining streams containing fatty acids and/or phosphatide material (e.g., soapstock, acidulated soapstock, etc.). In some aspects, the lecithin-containing material may be a purified lecithin stream resulting from solvent extraction or solvent precipitation, for example acetone or ethanol extraction/precipitation. In yet other aspects, the lecithin-containing material may come from animal sources, such as egg yolks and various animal sources.

It shall be understood that despite the various aspects, the lecithin-containing material preferably comes from crude products rather than food-grade products. Thus, crude products that are dark in color, odorous, or otherwise undesirable for food and personal care applications are preferred sources for the lecithin-containing material (however, food-grade lecithin may also be used as the lecithin-containing material).

Regardless of the source, the lecithin-containing material comprises a small amount of water, phosphatides (typically defined by acetone insoluble matter), free fatty acids, and oil. In preferred aspects, the lecithin-containing material comprises less than 10 wt % water (more preferably less than 5 wt %, less than 2 wt %, and less than 1 wt %), between 20 wt % and 80 wt % acetone insoluble matter (mostly phosphatides), between 1 wt % and 30 wt % free fatty acids (more preferably between 10 wt % and 20 wt %, and even more preferably about 15 wt %), with the remaining balance being oil. Note that moisture (water) content is determined using AOCS method Ja 2b-87 and acetone insoluble matter is determined using AOCS method Ja 4-46.

It shall be understood that the preferred acid value depends on the source used to derive the lecithin-containing material.

Fatty Acid Source

One or more fatty acid sources (in addition to the fatty acid already present in the starting lecithin-containing material) may be added to the lecithin-containing material to obtain a lecithin fatty acid blend. It shall be understood that the amount of fatty acid source added to the lecithin-containing material will directly depend on the amount of fatty acid already present in the lecithin-containing material. For example, lecithin-containing material having a high amount of fatty acid does not require as much addition of a fatty acid source as a lecithin-containing material having a low amount of fatty acid. It shall also be understood that, if desired, the fatty acid source may be used to further dry the lecithin-containing material as described in co-pending U.S. Provisional applications 62/056,954 (filed Sep. 29, 2014) and 62/084,612 (filed Nov. 26, 2014), collectively filed as PCT Application No. PCT/US15/0529312 on Sep. 29, 2015.

Many types of fatty acid sources may be used, including both natural and petrochemical fatty acid sources. For cost effective reasons, fatty acids derived from crude waste streams, for example deodorized distillate streams, vegetable oils, and recovered corn oil streams (and derivatives thereof, for example, polymerized corn oil streams), are desirable fatty acid sources as well as fatty acids derived from waste streams containing phosphatides and other impurities (e.g., sterols, tocopherols, starches, waxes, etc.). However, fatty acids in their natural or synthetic form may also be utilized herein as the fatty acid source. The fatty acid source may also derived from a combination of various waste streams, a combination of various natural or synthetic oils, or a combination of both waste streams and natural/synthetic oil.

In preferred aspects, the fatty acid source has a viscosity ranging from 20 to 400 cSt at 25° C., and more preferably 30 to 200 cSt at 25° C. In further preferred aspects, the fatty acid source may be deodorized distillates (e.g., a distillate that is solid at 25° C.; 20 cSt at 40° C.), and products based on recovered corn oil (typically 40 cSt at 25° C.).

Carboxylic Acid Source

An alternative to adding a fatty acid source to the lecithin-containing material is to add other carboxylic acid sources to obtain a lecithin organic acid blend. Suitable organic acids may be selected from the group of acidifiers consisting of lactic acid, propionic acid, acetic acid, fumaric acid, citric acid, ascorbic acid, gluconic acid, lactone of gluconic acid, adipic acid, malic acid, tartaric acid, other hydroxyacids, salts of any thereof, esters of any thereof, or combinations of any thereof.

The Reaction Mixture

The lecithin-containing material and fatty acid or another carboxylic acid source react until desirable characteristics, described below, and a homogenous blend of lecithin-containing material and fatty acid or carboxylic acid source are achieved. An optional elevation in temperature between about 50 and 150° C. (and more preferably around about 135° C.) may be introduced. In some cases, this reaction temperature may cause a darkening in color, and more specifically an increase in Gardner color of at least 1 unit, and/or a slight reduction in AI, which may be desirable for certain industrial-grade end-use applications.

Resulting Lecithin Blend Product

Upon completion of the reaction, the resulting product is a resulting lecithin blend product with the following characteristics:

a. A Brookfield Viscosity at 25° C. (ASTM D2983) of 100 to 15000 cP, and more specifically 2000 to 12000 cP, and even more specifically 5000 to 9000 cP. In preferred aspects, the viscosity ranges from 1500 to 2500 cP, and in even more preferred aspects, the viscosity ranges from 1000 to 5000 cP.

b. An acid value (following AOCS Cd 3d-63) of 1 to 100 mg KOH/g, and more specifically 50-90 mg KOH/g, and even more specifically 10 to 70 mg KOH/g, 5 and 50 mg KOH/g, and 15 to 40 mg KOH/g.

End-Use Applications

The resulting lecithin blend product may be used to compatibilize inorganic materials into an oleophilic phase. Specifically, the resulting lecithin blend may be incorporated into various asphalt applications (roofing, coatings, roads), for example as an anti-strip, surfactant, compaction aid additive, asphalt emulsifier, or as a dispersant of granulate and particulates in organophilic binders (asphalt roofing shingles) wherein the granulate may include but is not limited to calcium carbonate, mineral aggregates, and clay. Furthermore, the asphalt use may comprise hot mix asphalt (HMA), warm mix asphalt (WMA), asphalt emulsions or invert emulsion applications, or cold patch (solvent cut back) applications. The asphalt may also include additional additives or components required for the respective application.

The resulting lecithin blend also may be incorporated into oil field/industrial (organomodified clay, surfactants, etc.) applications and may even be incorporated into personal care applications.

Some end-use applications are explained in further detail below.

For the purpose of this invention, asphalt, asphalt binder, and bitumen refer to the binder phase of an asphalt pavement. Bituminous material may refer to a blend of asphalt binder and other material such as aggregate or filler. The binder used in this invention may be material acquired from asphalt producing refineries, flux, refinery vacuum tower bottoms, pitch, and other residues of processing of vacuum tower bottoms, as well as oxidized and aged asphalt from recycled bituminous material such as reclaimed asphalt pavement (RAP), and recycled asphalt shingles (RAS).

Anti-Strip Applications

The resulting lecithin blend product may be used as an anti-stripping agent in asphalt applications.

Without being bound to any theory, it is believed that the fatty acid and phosphatidyl material in the lecithin blend product synergistically interacts with moisture, and/or calcium, or other metal content of the substrate which consequently enhances adhesion between the binder and the substrate.

In one embodiment of the present invention, the lecithin blend product described herein is thoroughly mixed with an asphalt binder. The lecithin blend product/asphalt binder mixture is mixed until a homogenous product is reached (typically, the mixture may be heated between 70-150° C. and agitated to facilitate a homogenous blend). In preferred aspects, the mixture comprises 0.1-3 wt % of the lecithin blend product with the balance being asphalt binder. The resultant processed lecithin blend product/asphalt binder mixture is then typically mixed at approximately 5% use level with an aggregate substrate, or according to the mix design called for by the road manufacturer.

Organophilic Clay Applications

Having desirable viscosity and low temperature properties, the lecithin blend product of this invention therefore is particularly suited for use as a reagent and beneficial additive for organophilic clay manufacture or in the modification of invert mud formulations. One skilled in the art will appreciate that incorporation into other organic media is possible.

Oil Field/Industrial Applications

It is believed that this lecithin blend product may also be used as a surfactant, de-dust aid, or an emulsifying agent in oil field (e.g., drilling and corrosion inhibition) and mining applications. Even more generally, this lecithin blend product may be used in applications involving interfacial interactions with monovalent and divalent metal containing substrates (e.g., calcium-containing substrates).

Asphalt Pavement Compaction Aids

Asphalt pavements require a minimum amount of energy to be produced and compacted. This energy is provided through a combination of heat and mechanical energy through use of roller compactors. Thus additives allowing for reduction in the required compaction energy to achieve target mixture density can enable a reduction of the compactor passes or the temperature, thus enabling an increase in the maximum haul distance of the asphalt mixture from the plant to the job site.

The different mechanisms through which such compaction aid additives function may include increased lubrication of aggregates during asphalt mixture compaction, reduction of the binder viscosity at production temperatures, and better coating and wettability of the aggregates. Thus a diverse range of chemicals and additives may exhibit one or more of the properties attributed to compaction aids when added to an asphalt mixture.

The lecithin blend product described herein can be used as a compaction aid, to achieve a decrease in the required compaction energy through increase in aggregate lubrication and aggregate wettability. In such an application the additive would be used at dosages preferably in the range of between about 0.1 and 2% by weight of the bitumen.

Lecithin may be used as a reagent in the manufacture of organophilic clays and as a beneficial additive to invert drilling mud formulation in which these clays are utilized. Further, in these invert mud formulations fatty acids may be used as primary emulsifiers. Having desirable viscosity and low temperature properties, the lecithin blend of this invention therefore is particularly suited for use as a reagent and beneficial additive for organophilic clay manufacture or in the modification of invert mud formulations.

It is believed that this lecithin blend may also be used as a surfactant, de-dust aid, or an emulsifying agent in oil field (e.g., drilling and corrosion inhibition) and mining applications. Even more generally, this lecithin blend may be used in applications involving interfacial interactions with monovalent and divalent metal containing substrates (e.g., calcium-containing substrates).

EXAMPLES

The following examples are presented to illustrate the present invention and to assist one of ordinary skill in making and using same. The examples are not intended in any way to otherwise limit the scope of the invention.

Example 1

Asphalt mixtures were produced using an aggregate and bitumen known to be highly susceptible to moisture damage. The aggregate was sampled from a quarry in Lithonia, Georgia. The mixture was designed to meet a very common Georgia Department of Transportation mixture design requirement for a 12.5 mm maximum nominal aggregate size. The uncompacted mixture was allowed to rest for 2±0.5 hrs at ambient room temperature conditions before being subjected to 16±1 hr of oven aging at 60° C. before compaction to 7±0.5% air voids using a gyratory compactor. The mix design was based on Superpave specifications as defined by AASHTO R30 and GDOT mixture specifications. The asphalt content was 5.4% by weight of the mixture, the Voids in Mineral Aggregate (VMA) were 16, 3% by volume, and the Voids Filled with Asphalt (VFA) was 75.5% by volume of the mixture. These values were targeted for all the versions of the mixture.

Generally the lecithin blends were produced by charging the lecithin and the fatty acid source at the dosage required to achieve the target acid value in a round bottom reactor. The lecithin used has an AI value ranging from 60-65%. The blend was heated to 50-60° C. (temperature exceeding the melting point of the fatty acid) and agitated for 1 hour. Blends #1 and #2 followed this procedure. Soy lecithin and food grade soy fatty acid were used as the blend components. Blends #3 and #4 were comprised of soy lecithin and deodorized distillate, heated to 120-130° C. and agitated for 1 hr.

In all examples, addition of the lecithin blend to the bitumen was by heating the bitumen to 150° C. for approximately 1 hr, adding the desired dosage of the lecithin blend and agitated until full uniformity was achieved. Due to the high level of asphalt compatibility, required asphalt blend times were less than 5 minutes in the laboratory.

In order to evaluate the effect of adding lecithin blend as an anti-stripping additive, the mixtures were evaluated following the AASHTO T283 standard procedure. The bitumen was treated with 0.5% of the lecithin blends by weight of the bitumen and used to produce sets of 6 compacted mixture samples that were 150 mm in diameter and 95 mm in thickness using the previously described mix design procedure for every antistrip. Three of the 6 samples were tested for tensile strength using indirect tensile strength ratio (TSR) procedure on a Marshall Press Apparatus manufactured by Pine Instrument Company. The other three samples were subjected to 70-80% saturation of the internal voids with water and placed in a freezer for 16 hrs followed by 24 hrs of conditioning in a 60° C. water bath. All 6 samples were placed in a 25° C. water bath for 2 hrs prior to testing for indirect tensile strength at a rate of 50 mm/min to achieve temperature equilibration. The tensile strength values before and after conditioning and the ratio between the two values are used as an indication of the moisture damage resistance, with higher ratio values indicating higher resistance to moisture damage, and thus better performance from the incorporated anti-stripping additive.

Using the described procedure, lecithin blends with varying ratios of fatty acid were tested and compared to the control (un-treated) mixture. The different blends are characterized in terms of the Acid Value (AV). The results are shown in Table 1 and FIG. 1.

TABLE 1

| Sample Description | Acid Value (mg KOH/g) | Conditioned ITS (psi) | Unconditioned ITS (psi) | Tensile Strength Ratio (TSR) |
|---|---|---|---|---|
| No Anti-strip | N/A | 27.2 | 104.5 | 0.26 |
| 0.5% wt. Blend #1 | 18 | 97.9 | 110.1 | 0.89 |
| 0.5% wt. Blend #2 | 30 | 102.4 | 103.5 | 0.99 |
| 0.5% wt. Blend #3 | 50 | 84.7 | 97.6 | 0.87 |
| 0.5% wt. Blend #4 | 90 | 85.3 | 112.3 | 0.76 |

By plotting the data from Table 1 by Acid Value, a trend is observed based on which the tensile strength ratio initially increases with the addition of the Acid Value to a maximum value, before subsequently decreasing as the Acid Value is further increased. The results show that an "optimum" blend proportion can be achieved based on the Acid Value. This optimum value is expected to vary based on the raw material sources and the bitumen and aggregate used in the mixture design.

Example 2

Asphalt mixtures prepared as described in Example 1 were analyzed in terms of compactability by calculating the percent densification (reduction in sample height) with each gyration in the Superpave gyratory compactor used in accordance to AASHTO R35, as shown in FIG. 2. The percent densification at 15 gyrations was quantified as a point of comparison between samples treated with lecithin blends containing different levels of fatty acid incorporation. The results are shown in Table 2.

The results show that a statistically significant trend exists between the acid value of the lecithin blend and the beneficial contribution of the blend as a "compaction aid" additive. Analysis of Variance was performed on the results from the three analyzed replicates, showing a very high statistical significance (p-value <0.001). FIG. 3 shows that increasing the acid value improved the densification of the mixture.

TABLE 2

| Sample Description | Acid Value (mg KOH/g) | Densification at 15 Gyrations |
|---|---|---|
| 0.5% wt. Soy Lecithin + Soy Fatty Acid (AV = 18) | 18 | 10.86% |
| 0.5% wt. Soy Lecithin + Soy Fatty Acid (AV = 30) | 30 | 11.05% |
| 0.5% wt. Soy Lecithin + Soy Fatty Acid (AV = 50) | 50 | 11.20% |
| 0.5% wt. Soy Lecithin + Soy Fatty Acid (AV = 90) | 90 | 11.64% |

Example 3

Polyphosphoric acid (PPA) may be added at 0.3 to 2.0% dosages by weight of the bitumen in order to increase the stiffness of the bitumen. Concerns exist in the industry with use of amine-based antistrip additives in conjunction with polyphosphoric acid with regards to neutralization of the effects of the additives in the bitumen.

Asphalt mixtures prepared following the method described in Example 1, were tested using the Tensile Strength Ratio procedure following AASHTO T283 and compared in order to validate applicability of the antistrip material when used in bitumen modified with polyphosphoric acid.

Table 3 shows a summary of the results.

TABLE 3

| Sample Description | Base Bitumen | Conditioned ITS (psi) | Unconditioned ITS (psi) | TSR |
|---|---|---|---|---|
| No Anti-strip | Unmodified | 27.2 | 104.5 | 0.26 |
| 0.5% wt. Blend #1 (AV = 18) | Unmodified | 97.9 | 110.1 | 0.89 |
| 0.5% wt. Blend #2 (AV = 30) | Unmodified | 102.4 | 103.5 | 0.99 |
| 0.5% wt. Blend #3 (AV = 50) | Unmodified | 84.7 | 97.6 | 0.87 |
| No Anti-strip | PPA Modified | 132 | 113.3 | 0.83 |
| 0.5% wt. Blend #1 (AV = 18) | PPA Modified | 127.8 | 118.6 | 0.93 |
| 0.5% wt. Blend #2 (AV = 30) | PPA Modified | 129.2 | 116.7 | 0.90 |
| 0.5% wt. Blend #3 (AV = 50) | PPA Modified | 128.8 | 113.3 | 0.88 |

The results shown in Table 3 and compared in FIG. 4 show that the presence of polyphosphoric acid did not lead to adverse effects on the ability of the lecithin blend to improve the moisture damage resistance.

Example 4

A PG64-22 base binder from the Flint Hills refinery was annealed for 1 hour at 150° C. after which 0.5% by weight of 105% Polyphosphoric Acid (PPA) was added and homogenized. This was followed by the addition of 0.5% by weight of Blend #2 (from Example 1). A second sample was prepared with addition of 0.5% Blend #2 additive and no PPA. A control sample was also prepared of the PG64-22 asphalt without any additives. The asphalt binders were stored in a 150° C. oven in closed containers for the period of 30 days and mixed daily.

Samples were evaluated at the onset, after 7 days, 20 days, and 30 days of storage in the 150° C. oven using a boiling test in accordance to ASTM D3625, in which aggregates were coated with 5% by weight of asphalt, allowed to condition at 25° C. for 24 hrs, and then subjected to boiling for 10 minutes. The number of uncoated aggregates was counted to get an approximate quantitative measure of the percent of unstrapped aggregate for each binder type after the completion of the boiling test. The results are shown in the Table 4.

TABLE 4

| | % Aggregates Coated | | |
|---|---|---|---|
| Days at 150° C. | +0.5% PPA +0.5% Blend #2 | +0.5% Blend #2 | No Additive |
| 0 days | 89% | 91% | 71% |
| 7 days | 89% | 81% | 69% |
| 20 days | 90% | 74% | 54% |
| 30 days | 85% | 60% | 50% |

The results show a consistent loss of performance for the untreated neat binder with increased storage time. The binder with only Blend #2 additive showed a marked improvement in the percent coated aggregate, but also showed a gradual loss of performance with increased high temperature storage time. The sample with both PPA and the Blend #2 showed similar initial coating to that of the sample without PPA, but was able to consistently retain its performance throughout the 30 days of storage. The results show that combination of Polyphosphoric acid and the lecithin and fatty acid blend provided beneficial performance in terms of both moisture resistance and high temperature storage stability.

We claim:

1. A method of incorporating a lecithin blend product in asphalt applications, comprising:
   (a) obtaining a lecithin blend product, comprising of lecithin and a fatty acid source with an acid value between 1 and 100 mg KOH/g; and
   (b) adding the lecithin blend product to an asphalt binder thereby forming a mixture; wherein the amount of the lecithin blend product ranges from 0.1 to 3 wt % of the mixture.

2. The method of claim 1, wherein the asphalt application is an anti-strip.

3. The method of claim 1, wherein the asphalt application is a compaction aid additive.

4. A method of incorporating a lecithin blend product in asphalt applications, comprising:
   (a) obtaining a lecithin blend product, comprising of lecithin and a fatty acid source with an acid value between 50 and 100 mg KOH/g; and
   (b) adding the lecithin blend product to an asphalt binder thereby forming a mixture; wherein the amount of the lecithin blend product ranges from 0.1 to 3 wt % of the mixture.

5. A method of incorporating a lecithin blend product in asphalt applications, comprising:
   (a) obtaining a lecithin blend product, comprising of lecithin and a fatty acid source with an acid value between 15 and 40 mg KOH/g; and
   (b) adding the lecithin blend product to an asphalt binder thereby forming a mixture; wherein the amount of the lecithin blend product ranges from 0.1 to 3 wt % of the mixture.

* * * * *